United States Patent
Math

(10) Patent No.: US 9,275,467 B2
(45) Date of Patent: Mar. 1, 2016

(54) INCREMENTAL CONTOUR-EXTRACTION SCHEME FOR BINARY IMAGE SEGMENTS

(75) Inventor: Roopa S. Math, Gulbarga (IN)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 13/433,429

(22) Filed: Mar. 29, 2012

(65) Prior Publication Data

US 2013/0259382 A1    Oct. 3, 2013

(51) Int. Cl.
*G06K 9/00* (2006.01)
*G06T 7/00* (2006.01)

(52) U.S. Cl.
CPC ..... *G06T 7/0085* (2013.01); *G06T 2207/20136* (2013.01)

(58) Field of Classification Search
None
See application file for complete search history.

(56) References Cited

U.S. PATENT DOCUMENTS

| | | | |
|---|---|---|---|
| 5,081,689 A | 1/1992 | Meyer et al. | |
| 5,448,692 A | 9/1995 | Ohta | |
| 5,583,949 A * | 12/1996 | Smith | G06K 9/481 382/199 |
| 5,619,594 A * | 4/1997 | Melen | 382/233 |
| 5,621,819 A | 4/1997 | Hozumi | |
| 5,644,656 A * | 7/1997 | Akra et al. | 382/215 |
| 5,748,777 A * | 5/1998 | Katayama et al. | 382/199 |
| 5,774,579 A * | 6/1998 | Wang et al. | 382/176 |
| 6,082,619 A * | 7/2000 | Ma et al. | 235/462.1 |
| 6,243,499 B1 * | 6/2001 | Loce et al. | 382/269 |
| 6,292,585 B1 * | 9/2001 | Yamaguchi et al. | 382/232 |
| 6,367,698 B1 * | 4/2002 | Yamamoto et al. | 235/462.11 |
| 6,738,496 B1 * | 5/2004 | Van Hall | 382/101 |
| 7,110,607 B2 * | 9/2006 | Fujimoto et al. | 382/237 |
| 7,151,843 B2 | 12/2006 | Rui et al. | |
| 7,158,688 B2 | 1/2007 | Nako et al. | |
| 7,376,252 B2 | 5/2008 | Gritzky et al. | |
| 7,379,578 B2 | 5/2008 | Soussaline et al. | |
| 7,538,764 B2 | 5/2009 | Salomie | |
| 7,693,563 B2 | 4/2010 | Suresh et al. | |
| 7,835,568 B2 | 11/2010 | Park et al. | |
| 1,025,576 A1 | 10/2011 | Deischinger et al. | |
| 2002/0014533 A1 | 2/2002 | Zhu et al. | |
| 2007/0098264 A1 * | 5/2007 | Van Lier et al. | 382/199 |
| 2007/0115357 A1 * | 5/2007 | Stein | B60Q 1/0023 348/148 |
| 2007/0297679 A1 * | 12/2007 | Sato | 382/192 |
| 2008/0193180 A1 | 8/2008 | Shim et al. | |

(Continued)

FOREIGN PATENT DOCUMENTS

| | | |
|---|---|---|
| CN | 102096802 A | 6/2011 |
| EP | 0521559 A1 | 1/1993 |

(Continued)

OTHER PUBLICATIONS

International Search Report and Written Opinion in PCT Application Serial No. PCT/US2013/034624 mailed Jan. 27, 2014, 10 pages.

(Continued)

*Primary Examiner* — Bhavesh Mehta
*Assistant Examiner* — Oneal R Mistry
(74) *Attorney, Agent, or Firm* — Patent Capital Group

(57) ABSTRACT

Contours of objects appearing in a digital image are extracted in a plurality of one-directional passes across the digital image. Each pass loads rows or columns of the image into a local memory, in the order they appear in the image, and analyzes them for the presence of portions of the full contour. The portions are then combined to create the full contour.

22 Claims, 4 Drawing Sheets

(56) References Cited

U.S. PATENT DOCUMENTS

| | | | |
|---|---|---|---|
| 2009/0116731 A1 | | 5/2009 | Melkisetoglu et al. |
| 2009/0295828 A1* | | 12/2009 | Koziarz et al. ............... 345/619 |
| 2010/0046856 A1* | | 2/2010 | Bai et al. ....................... 382/293 |
| 2011/0216086 A1* | | 9/2011 | Hitosugi ........................ 345/629 |

FOREIGN PATENT DOCUMENTS

| | | |
|---|---|---|
| EP | 0593028 A1 | 4/1994 |
| TW | 200929008 A | 7/2009 |
| WO | WO-2004084138 A2 | 9/2004 |

OTHER PUBLICATIONS

Michel Cesar et al., "An algorithm for segmenting handwritten postal codes," International Journal of Man-Machine Studies, vol. 33, Issue 1, Jul. 1990, pp. 63-80, ISSN 0020-7373, http://dx.doi.org/10.1016/S0020-7373(05)80115-4. (http://www.sciencedirect.com/science/articie/pii/S0020737305801154)—Abstract Only (1 page).

W.H.H.J Lunscher, "Fast Binary-Image Boundary Extraction," Computer Vision, Graphics, and Image Processing, Elsevier Science, vol. 38, No. 3, Jun. 1, 1987, pp. 229-257.

Fu Chang et al., "A linear-time component-labeling algorithm using contour tracing technique," Computer Vision and Image Understanding xxx (2003) xxx-xxx. Received Aug. 8, 2003; Accepted Sep. 8, 2003, www.eisevier.com/locate/cviu, 15 pages.

Mingwu Ren et al., "Tracing boundary contours in a binary image," Image and Vision Computing, vol. 20, No. 2, Feb. 1, 2002, pp. 125-131,—Abstract Only (1 page) URL: http://www.sciencedirect.com/science/article/pii/S0262885601000919.

\* cited by examiner

INCREMENTAL CONTOUR-EXTRACTION SCHEME FOR BINARY IMAGE SEGMENTS

TECHNICAL FIELD

Embodiments of the invention generally relate to digital-image processing and, in greater detail, to detecting contours in images.

BACKGROUND

Finding a contour of an object (i.e., the object's border or outline) in a digital image is often the first step in many image-analysis applications, such as object detection or object classification. Given a preprocessed version of the image, many current contour-extraction methods identify an edge pixel and search the area of the image nearby for another, connected edge pixel. The area searched may include the four pixels connected to a side of the current edge pixel (i.e., the "four-connected neighbors") or the eight pixels connected via both sides and corners (i.e., the "eight-connected neighbors"). By repeatedly searching for more connected edge pixels, a contour may be traced by traversing the edge, wherever in the image it leads, in a clockwise or counter-clockwise direction. As more edge pixels are found, they may be added to a list of pixels belonging to the contour. This process is continued until the first identified edge pixel is encountered again (i.e., the entire contour is traced).

While this technique may find the contours present in an image, it may run quite slowly on some processors. Because the edge path may travel in any direction, and because this direction cannot be predicted, pixels from any portion of the image may need to be analyzed as the algorithm works. Many processors (especially low-power or digital-signal processors) are unable to store an entire image in local, fast memory and must therefore load necessary portions of the image from external, slow memory as they are needed. These memory accesses may significantly retard the operation of the algorithm. Other algorithms may process the digital image in a more deterministic fashion (e.g., by marching across the pixels in the image), but these methods are typically incapable of fully identifying the contours of complex shapes. A need therefore exists for a way to detect contours of arbitrary shapes in a digital image in a manner that runs efficiently on a processor having a small local memory.

SUMMARY

In general, various aspects of the systems and methods described herein extract contours of shapes within digital images by making a maximum of deterministic and predictable passes—e.g., four such passes—across the image. The passes may include or consist of a top-to-bottom pass, a bottom-to-top pass, a left-to-right pass, and/or a right-to-left pass. Because each pass proceeds row-by-row (or column-by-column) across the image, soon-to-be needed rows or columns may be prefetched from an external memory into a local, fast memory before they are needed, thus saving delays incurred by random accesses to the external memory. The multiple passes may each extract a portion of the full contour of a shape; the passes proceed until the portions may be combined to create the full contour. The combination and/or checking of the portions may proceed in two directions simultaneously, thus providing a further speed benefit. In one embodiment, during each pass, an extracted left contour pixel is added to the left-most part of a list of discovered contour pixels and an extracted right contour pixel is added to the right-most part of the list of contour pixels to ensure that, at any given time, the list of contour pixels is ordered in accordance with the location of the pixels in the contour (i.e., reading the list in order represents an only one-directional movement along the contour). The direction may be clockwise or counter-clockwise; this ordering makes it easier to join the pieces of the contour extracted over different passes.

In one aspect, a method for extracting contours in a digital image includes performing a plurality of one-directional passes across the digital image. Each pass includes (i) loading rows or columns of the digital image from an external memory to a local memory, (ii) identifying pixels in each row or column that correspond to a new contour of an object in the digital image or to a continuation of an already-found contour of the object, and (iii) adding the identified pixels to a list of contour pixels corresponding to the object for the current pass. The list of contour pixels from each pass is combined into a full contour of the object.

The digital image may be a binary digital image. The plurality of one-directional passes may include of two, three, or four one-directional passes; each pass may include a top-to-bottom pass, a bottom-to-top pass, a left-to-right pass, and/or a right-to-left pass. Combining the list of contour pixels from each path may include searching for an endpoint of a first contour portion in a second, adjacent contour portion and connecting the first and second contour portions at the endpoint. Identifying pixels in each row or column that correspond to the new contour may include identifying an object at a position in a current row or column; the position may be unoccupied by the object at a corresponding position in a previous row or column. Identifying the object at the position in the current row or column may include identifying a binary "1" digit and wherein the corresponding position in the previous row or column held a binary "0" digit. Identifying pixels that correspond to a continuation of an already-found contour may include (i) finding a beginning pixel or an end pixel of the already-found contour in a previous row or column and (ii) searching for a neighboring contour pixel in a current row or column.

In another aspect, a system for extracting contours in a digital image includes a local memory for storing data corresponding to the image and a processor; the processor includes a memory management unit and an execution unit. The memory management unit loads a portion of the image from an external memory to the local memory. The execution unit executes instructions that (i) perform a plurality of one-directional passes across the digital image by analyzing the portion of the image, each pass identifying a portion of a contour of an object in the digital image and (ii) combine the portions of the contour into a full contour of the object.

The processor may be a digital-signal processor, and a size of the local memory may be less than the size of the image. The portions of the image loaded from the external memory may include rows or columns of the image. A high-speed interface may connect the local memory to the processor and a low-speed interface may connect the external memory to the processor. The instructions to combine the portions of the contour may include instructions to search for an endpoint of a first contour portion in a second, adjacent contour portion and to connect the first and second contour portions at the endpoint. The plurality of one-directional passes may include of two, three, or four one-directional passes, and may include a top-to-bottom pass, a bottom-to-top pass, a left-to-right pass, and/or a right-to-left pass.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which:

FIG. 3A illustrates a shape appearing in a binary image;

FIG. 3B illustrates a partial contour of the shape extracted in a first pass in accordance with an embodiment of the invention;

DETAILED DESCRIPTION

Figure 1:
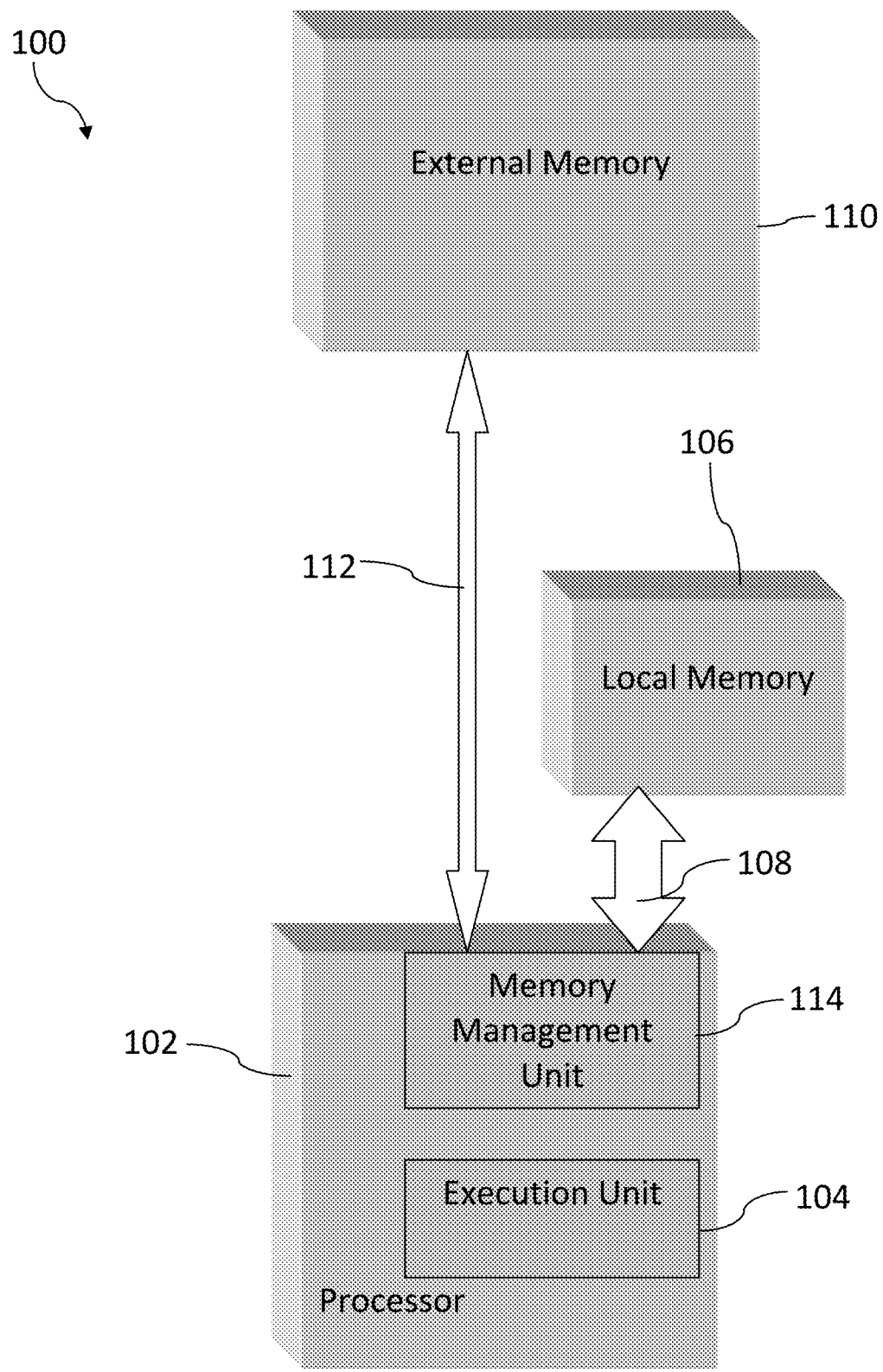
FIG. 1 illustrates a system for extracting contours in accordance with an embodiment of the invention.

Described herein are various embodiments of methods and systems for extracting contours of shapes appearing in digital images. A system 100 configured in accordance with an embodiment of the invention is illustrated in FIG. 1. A processor 102 executes stored instructions in an execution unit 104 to extract the contour. In one embodiment, a local memory 106 is located near the processor 102 and is connected to it via a high-speed interface 108; data in the local memory 106 may be accessed quickly and efficiently by the processor 102. The local memory 106 may be located physically adjacent to the processor 102 (as shown in FIG. 1) and configured as, for example, a local SRAM or cache memory. In another embodiment, the local memory 106 is located within the processor 102 as an on-chip cache (e.g., L1 or L2 memory), register file, or any other type of high-speed storage. The processor 102 may be any type of digital processor, such as a microprocessor, low-power processor, digital-signal processor, or ASIC. The current invention is not, however, limited to any particular type of processor 102 or local memory 106.

In one embodiment, the processor 102 extracts one or more contours of objects in a digital image having a size larger than the maximum storage capacity of the local memory 106. In this embodiment, the entire image (or the remainder of the image not otherwise stored in the local memory 106) is stored in an external memory 110, which is connected to the processor 102 via a low-speed interface 112 (i.e., the speed/bandwidth of the interface 112 to the external memory 110 is less than the speed/bandwidth of the interface 108 to the local memory 106). As explained in greater detail below, the processor 102 (using, e.g., a memory-management unit 114) may pre-fetch portions of the image from the external memory 110 before they are needed, thereby avoiding any delay incurred by use of the low-speed interface 112. Embodiments of the invention also operate on systems having large local memories (i.e., memories large enough to store an entire digital image); the current invention is not limited to only systems having small local memories.

Figure 2:
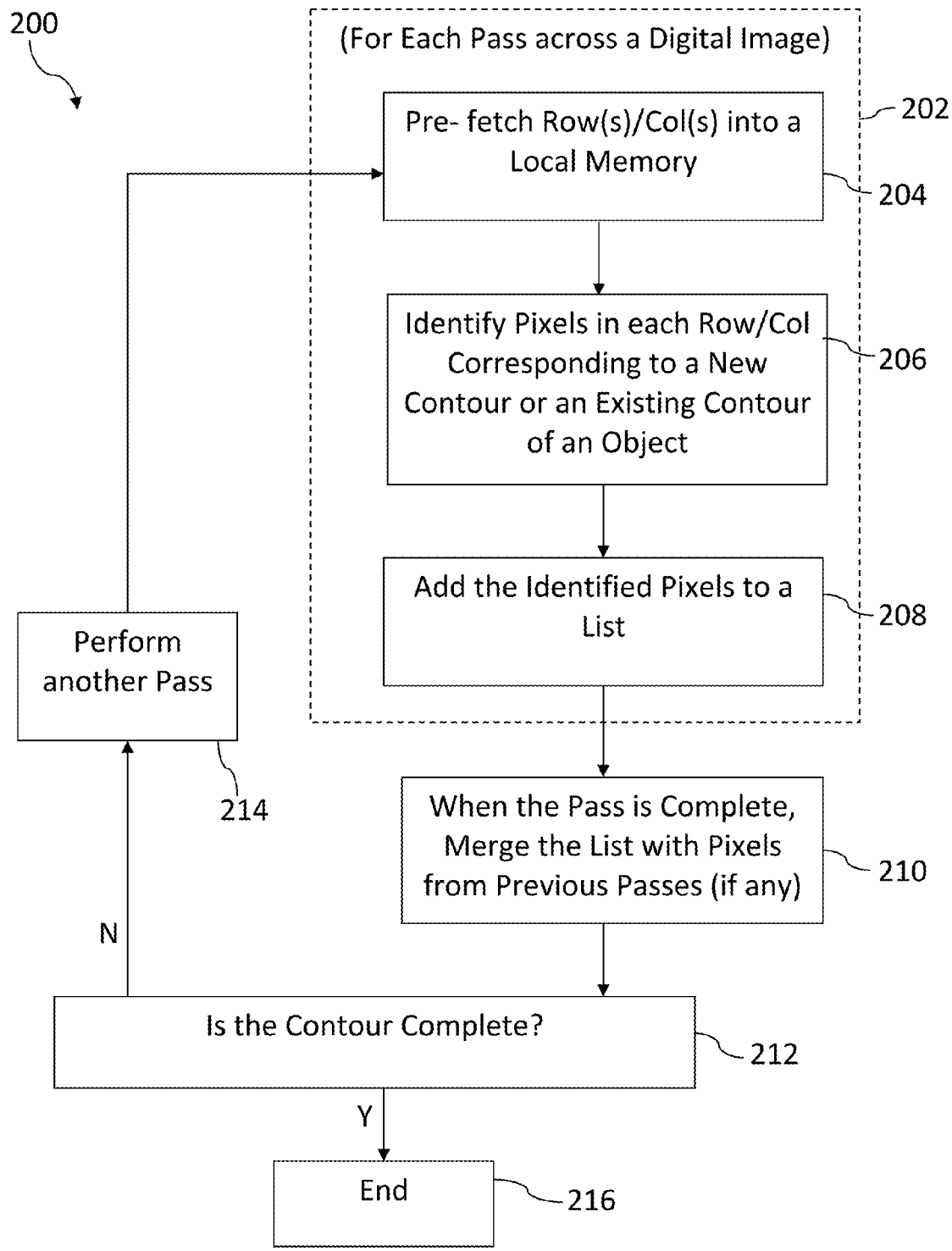
FIG. 2 illustrates a method for extracting contours in accordance with an embodiment of the invention.

A method 200 for extracting contours of shapes appearing in binary images is illustrated in FIG. 2. In brief overview, a series of one-directional passes is performed across the image and, after the completion of each pass, a test is performed to see if a full contour has been traced around any found objects. Up to four passes may be performed: top-to-bottom, bottom-to-top, left-to-right, and/or right-to left, and the performed passes may occur in any order. Each pass includes a one-directional march across the image; the march is by rows of the image in the case of top-to-bottom or bottom-to-top passes and by columns of the image in the case of left-to-right or right-to-left passes. Once a row or column is considered and analyzed, it may be discarded from the local memory 106 to thereby make room for additional rows or columns. In one embodiment, one row or column is analyzed at a time; while a first row or column is being analyzed, the next row or column may be pre-fetched from the external memory 110. More than one row or column may be analyzed at once, however, and multiple rows or columns may be pre-fetched at a time.

In greater detail, each pass 202 through the digital image includes pre-fetching rows or columns (step 204), identifying pixels in each row or column that belong to a contour of an object in the image (step 206), and storing any identified pixels (step 208) in, e.g., a list or data structure. In the pre-fetching step 204, the rows or columns may be fetched in order, beginning with the row or column at a first edge of the image and proceeding across the image to the far edge. The pre-fetching may be timed such that the rows or columns arrive at the processor 102 as they are needed for processing by the later steps in the pass. Thus, the pre-fetching may be timed in accordance with the latency of the external memory 110 and its interface 112. If the local memory 106 is large enough, several rows or columns may be pre-fetched in a single operation and stored therein, thus allowing the interface 112 to be free for other memory transactions. If the local memory 106 is too small to store a single row or column, only a portion thereof may be pre-fetched at once. In one embodiment, a left-to-right or right-to-left pass is preferred over a top-to-bottom or bottom-to-top pass (or vice versa) if the digital image is rectangular and one dimension (e.g., a column) fits inside the local memory 106 while the other dimension (e.g., a row) is too large to fit.

Figures 3A, 3B:
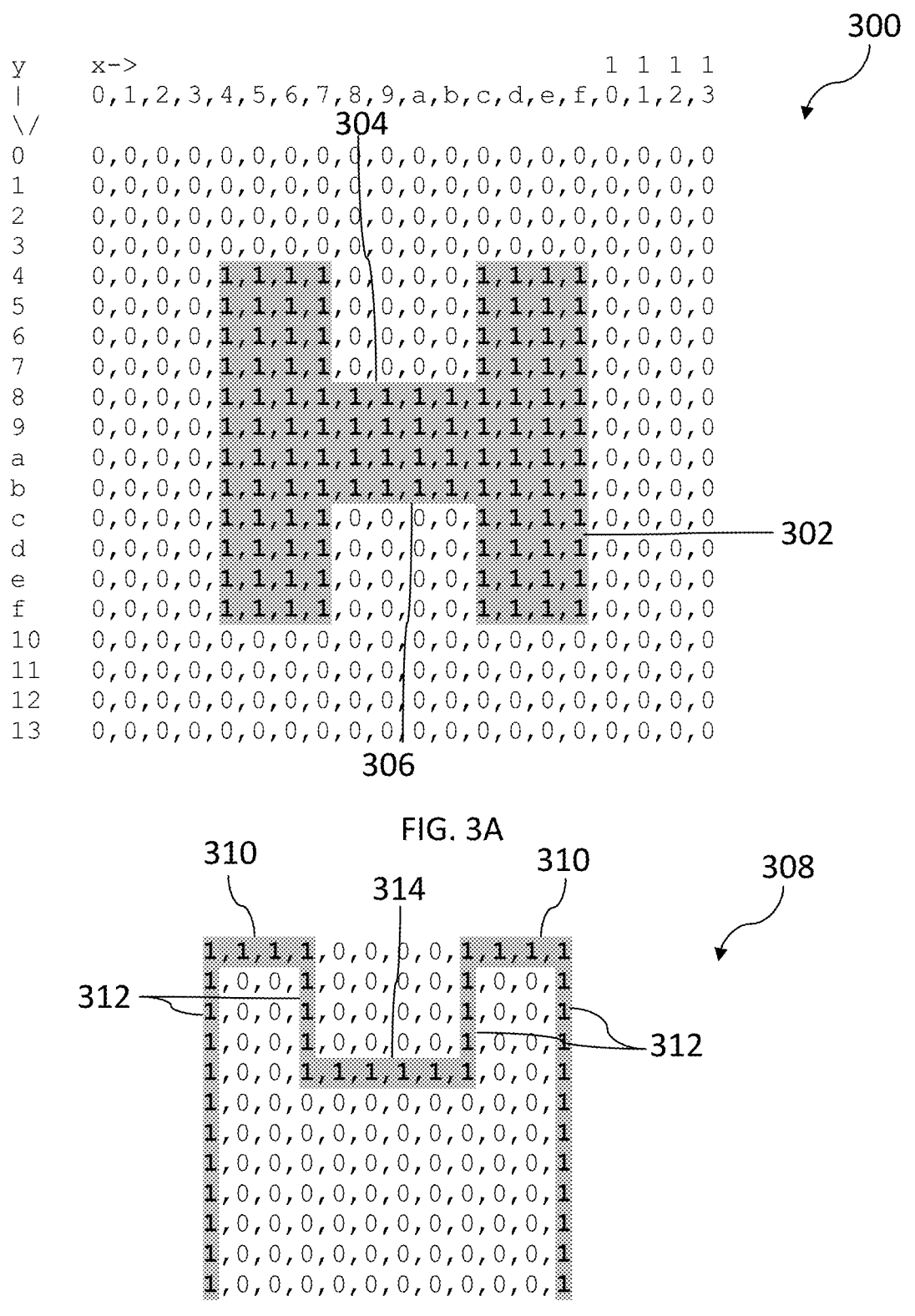

Once a row or column (or portion thereof) is available to the processor 102, it is analyzed for pixels corresponding to a contour of an object. In one embodiment, the digital image is a binary image, in which each pixel is represented by a binary "1" or "0." This binary image may be produced by, for example, analyzing the pixel values of the original digital image by intensity or color value and assigning a "1" if a pixel's intensity or color is greater than a threshold and a "0" otherwise. Any method of creation of the binary image is within the scope of the current invention, however. An example of a binary image is shown in FIG. 3A and discussed in greater detail below. In other embodiments, the processor analyzes raw image data and assigns a "1" or "0" value (or their equivalents) on the fly.

The first row or column of the binary image is searched for "1" pixels. In one embodiment, any such values found in the first row or column are designated as part of a contour of an object by virtue of their being on the edge of the digital image; in other embodiments, objects coincident with an edge of the digital image are not deemed to have a contour on that edge. The found "1" pixels that correspond to a contour are (like other such pixels found in later rows or columns) saved in a data structure (e.g., a list). For example, the (x,y) position (i.e., row and column number) of each contour pixel may be saved. If a series of adjacent "1" pixels is found (referred to herein as a "run" of pixels), the beginning and end points of the run of pixels may be determined and stored.

In one embodiment, a contour-node data structure stores information about the contour of an object. The contour-node data structure may include a plurality of (x,y) value pairs that represent either pixels in the contour or runs of pixels in the contour (referred to, collectively, as "nodes" of the contour). In another embodiment, instead of (x,y) value pairs, information about the contour nodes is stored in other formats (such as a Freeman code). Each node in the data structure may be associated with a pointer to a next node so that a contour may be traced from node to node. An "in-use" flag may also be associated with each node to indicate that the node is part of a current contour (and thus should not be changed).

Another data structure may be used to store information corresponding to a run of pixels (as referred to above). This run-length data structure may include, for each run of pixels, x-coordinates for the beginning and end points of the run of pixels and the y-coordinate of the run of pixels. These coordinates may be swapped appropriately for left-to-right or right-to-left passes through the digital image. Further information may be associated with each run of pixels, such as (i) if one, both, or neither of the ends of the run are currently connected to other nodes in the contour, (ii) a pointer to the next node in the contour, and/or (iii) if portions of the contour are extracted in multiple passes across the image, the portion to which the run belongs and a pointer to the next portion.

Information related to the portion of the contour extracted in a single pass may be stored in yet another data structure. This contour-header data structure may include the direction of the pass, the first contour node found for the portion, and the rightmost and leftmost nodes in the portion. Other information may include a pointer to additional pieces of the portion of the contour and/or a flag indicating that the portion is complete and should not be further changed.

Returning to the pass through the image, as subsequent rows or columns are pre-fetched and analyzed, additional "1" pixels may be found. Unlike the first row or column, however, not all of these "1" pixels may correspond to a contour, because some of them may correspond to interior portions of an object. To distinguish between these two types of "1" pixels, data from the previous row or column is analyzed and, in particular, the location of "1" pixels in the previous row or column may be retrieved from the data structure. If a "1" pixel is found at a certain position in a current row or column, but there was a "1" pixel at the corresponding position in the previous row or column, the current "1" pixel may be deemed to be an interior point in a found object and not stored in the data structure. In another embodiment, current "1" pixels may be tested to determine if they lie between the beginning and endpoints of any runs of pixels in the previous row or column. If not, and/or if there is no "1" pixel in a corresponding position in the previous row or column, the current "1" pixel may be deemed to be the leading edge of a newly found object, and thus saved as a new contour.

The positions of the beginning and end points of any runs found in the previous row or column may be examined in the current row or column to determine the new positions of the beginning and endpoints corresponding to each object. These positions may be found by searching the neighborhood of the previous beginning point for a zero-to-one transition in the current row or column and by searching the neighborhood of the previous end point for a one-to-zero transition in the current row or column. For example, if the object under consideration is a square, the positions of the beginning and end points remain the same in the current row or column as in the previous row or column, and thus the zero-to-one and one-to-zero transitions occur directly underneath the previous beginning and end points. If, however, the object under consideration changes its shape in the new row or column (as would, e.g., a triangle, trapezoid, or other similar shape), the zero-to-one and one-to-zero transitions may occur at new positions. In this case, the neighborhood of the previous beginning and end points is searched in the current row or column until the transitions, and thus the new points, are found. The new beginning and end points are saved in the data structure as part of its contour.

In one embodiment, each new row or column is analyzed in a single pass from a beginning pixel to an ending pixel, thereby speeding execution time. For example, each "1" pixel, runs of "1" pixels, and zero-to-one and one-to-zero transitions are detected in a single pass, and a determination is made during that pass which "1" pixels correspond to contours and which correspond to object interiors. The current invention is not limited to only this implementation, however, and any method of analyzing each row or column is within the scope of the current invention.

When the last row or column in the image is analyzed, the pass through the image is complete. The stored contour pixels may then be analyzed to determine if they represent one or more full contours (i.e., if they represent closed paths). In one embodiment, the entire contour of an object may be determined in a single pass, and the method exits. In other embodiments, however, the objects are too complicated to have their contours extracted in a single pass. For example, while the above method may extract a portion of a contour of an object having a concave edge facing the direction of the pass, it may not extract a portion of a contour of an object having a concave edge facing away from the direction of the pass at least because this away-facing concave edge, at the time of its discovery, may be part of the exterior contour or an interior contour. The type (interior/exterior) of the contour may be determined only when the pass reaches the end of image (i.e., the last row or column). For example, given a top-to-bottom pass, if the away-facing concave edge is like that of the bottom part of an "H" shape, then it is indeed part of the external contour of the shape. On the other hand, however, if the shape resembles an inverted "A", the detected contour corresponding to the crossbar of the "A" is part of an interior contour; which is realized only when the end/tip of the "A" is reached. A subsequent pass (e.g., a bottom-to-top pass) may be needed to decide its inclusion into the external contour. Thus, a second, third, or fourth pass may be necessary to complete the full contour of the object.

With reference again to FIG. 2, when additional passes are complete, any contour pixels found in the additional passes are merged with the contour pixels found in previous passes (step 210). The completeness of the merged contour pixels is analyzed (step 212) and, if a complete contour is not found, another pass is performed (step 214). If a full contour is found after two, three, or four passes, the process ends (step 216).

To check for the completeness of a contour, existing systems may chose a point on the contour trace it in a clockwise or counter-clockwise direction (depending on the way the contour pixels are stored). If the process finds its way back to the original point after traversing the contour, the contour is deemed complete. This traversing may require the re-visiting of previously examined rows or columns in the contour, however. For example, if the object is an "H" shape and the traverse is clockwise, the rows in the contour are loaded and analyzed once on the way down the right-hand side of the "H" shape and again on the way up on the left-hand side of the "H" shape. In one embodiment, the contour pieces are maintained in such a way that there is no need to trace both sides—it is enough to search in just one direction. For example, each contour piece may be maintained such that its rightmost and leftmost pixels are accessible (e.g., there are fields in a data structure that point to those pixels). A first contour piece may be have leftmost and rightmost pixels C1:Left and C1:Right and a second contour piece may have leftmost and rightmost pixels C2:Left and C2:Right. The rightmost pixel C1:Right in the first contour piece is accessed; the second contour piece is then searched in a clockwise direction, from its leftmost pixel C2:Left, until a pixel having the same coordinates as C1:Right is found. The searched pixels in the second contour piece (i.e., the pixels between C2:Left and C1:Right) thus correspond to an "overlapping" portion of the contour that appears in both the first and second contour pieces; this overlapping portion is discarded. Similarly to the above operation, the rightmost pixel C2:Right of the second contour is accessed and the first contour is searched from its leftmost pixel C1:Left (again in a clockwise direction); once the corresponding pixel is found, the overlapping region between C1:Left and C2:Right is also discarded. The non-discarded sections of the first and second contour portions are then combined to create a full contour of the object. In other embodiments, the search may be done in a counter-clockwise direction and/or more than two contour pieces may be stitched together.

An example binary image 300 is shown in FIG. 3A. The image is 14×14 pixels and includes a shape 302 that resembles the letter "H." Notably, the shape 302 has an upward-facing concave side 304 and a downward-facing concave side 306. FIG. 3B illustrates a result 308 of a top-to-bottom pass through the image 300 in accordance with an embodiment of the invention. As described above, the "1" pixels 310 in row 4 of the image 300 are deemed to be part of a contour because there were no corresponding "1" pixels in row 3 of the image 300; thus, as the "1" pixels in row 4 were encountered in the top-to-bottom pass, they were added to the contour of the object 302. As further rows 5-7 of the image 300 are analyzed, further contour pixels 312, corresponding to vertical portions of the original shape 302, are discovered in accordance with the current invention. As described above, the neighborhoods of the beginning and end points of the runs of pixels 310 are searched in later-analyzed rows to find further contour pixels (i.e., the pixels 312).

Still referring to FIG. 3B, when the pass through the object 302 reaches the first concave edge 304 (in row 8 of the original image 300), it discovers its corresponding contour portion 314. This new portion of the contour 314 connects the previously discovered portions 310, 312 of the contour, which, prior to reaching the first concave edge, appeared as if they were two separate objects. The portion 314 of the contour corresponding to the concave edge 304 may be detected by analyzing the absence of "1" pixels in corresponding positions in the previous row 7, by searching for zero-to-one or one-to-zero transitions (or the lack thereof) in the neighborhood of the beginning and end points of the runs of pixels 312, or by a combination of the two techniques. The remainder of the object 302 is scanned; the downward-facing concave edge 306 is not detected in this pass. At the end of the top-to-bottom pass, the extracted contour 308 is analyzed for completeness, and because it does not create a full path, another pass is performed.

Figure 3C:
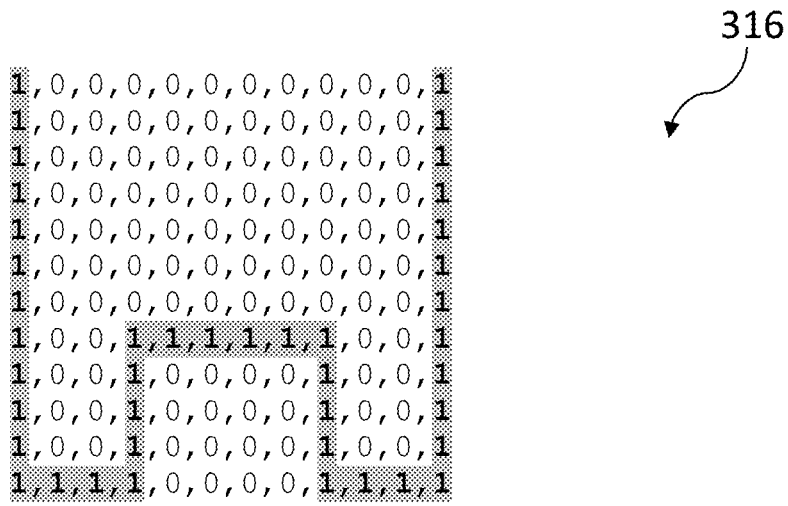
FIG. 3C illustrates a partial contour of the shape extracted in a second pass in accordance with an embodiment of the invention.
Figure 3D:
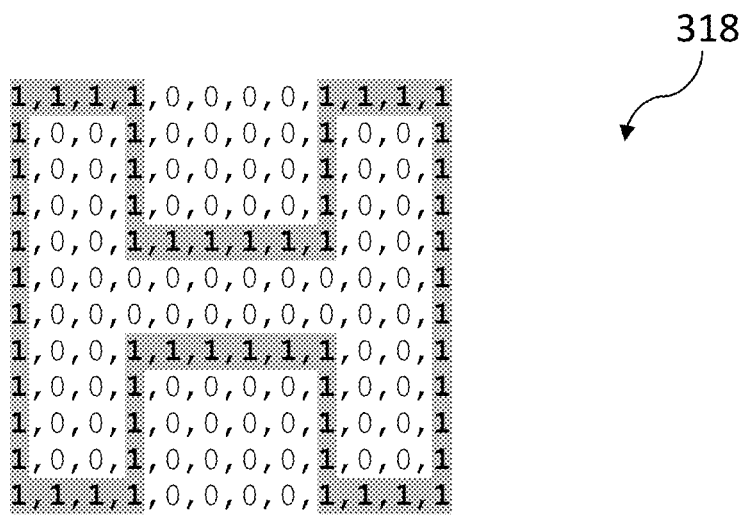
FIG. 3D illustrates a full contour of the shape combined from partial contours in accordance with an embodiment of the invention.

FIG. 3C illustrates a result 316 of a second, bottom-to-top pass of the image 300. The result 316 includes another part of the contour of the object 302; in this pass, the bottom-facing concave edge 306 is detected while the top-facing concave edge 304 is not (for reasons similar to the top-to-bottom pass described above). At this point, however, the two partial contours 308, 316 may be combined; the result 318 of their combination is shown in FIG. 3C. The resultant contour 318 is tested for completeness and, because it includes a full path around the exterior of the original object 302, no further passes are required, and the process halts.

It should also be noted that embodiments of the present invention may be provided as one or more computer-readable programs embodied on or in one or more articles of manufacture. The article of manufacture may be any suitable hardware apparatus, such as, for example, a floppy disk, a hard disk, a CD ROM, a CD-RW, a CD-R, a DVD ROM, a DVD-RW, a DVD-R, a flash memory card, a PROM, a RAM, a ROM, or a magnetic tape. In general, the computer-readable programs may be implemented in any programming language. Some examples of languages that may be used include C, C++, or JAVA. The software programs may be further translated into machine language or virtual machine instructions and stored in a program file in that form. The program file may then be stored on or in one or more of the articles of manufacture.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A method for extracting contours in a digital image, the method comprising:
performing a first one-directional pass across the digital image, the pass comprising:
i. loading rows or columns of the digital image from an external memory to a local memory,
ii. identifying pixels in each row or column that correspond to a contour of an object in the digital image, and
iii. adding the identified pixels to a list of contour pixels corresponding to the object for the current pass; and
iv. combining the list of contour pixels from the pass into the contour of the object; and
performing a second pass, comprising analyzing the contour pixels to classify the contour as a full closed-path contour comprising identifying an edge pixel for a first contour portion, identifying an edge pixel for a second contour portion, traversing the contour from the edge pixel of the second contour portion until finding a pixel having coordinates the same as the edge pixel for the first contour portion, identifying an overlapping portion of the first and second contour portions, and discarding the overlapping portion.

2. The method of claim 1, further comprising performing a second, third, or fourth one-directional pass, and combining contour pixels identified in the passes with the contour pixels identified in the first pass.

3. The method of claim 2, wherein combining the list of contour pixels from each pass comprises searching for an endpoint of a first contour portion in a second, adjacent contour portion and connecting the first and second contour portions at the endpoint.

4. The method of claim 1, further comprising performing a plurality of one-directional passes comprising a top-to-bottom pass, a bottom-to-top pass, a left-to-right pass, and a right-to-left pass.

5. The method of claim 1, wherein the digital image is a binary digital image.

6. The method of claim 1, wherein identifying pixels in each row or column that correspond to the contour comprises identifying an object at a position in a current row or column, wherein the position was unoccupied by the object at a corresponding position in a previous row or column.

7. The method of claim 6, wherein identifying the object at the position in the current row or column comprises identifying a binary "1" digit and wherein the corresponding position in the previous row or column held a binary "0" digit.

8. The method of claim 1, wherein identifying pixels in each row or column that correspond to the contour of the object comprises (i) finding a beginning pixel or an end pixel of an already-found contour in a previous row or column and (ii) searching for a neighboring contour pixel in a current row or column.

9. The method of claim 1, wherein:
traversing the contour comprises:
  i. identifying the overlapping portion of the first and second contour portions, comprising accessing a first pixel of the first contour; and
  ii. searching the second contour in the one direction from a second pixel of the second contour until a pixel is found having the same coordinates as the first pixel of the first contour to identify a first overlapping portion of the contours;
  iii. discarding the overlapping portion;
  iv. accessing a first pixel of the second contour;
  v. searching the first contour in the one direction from a second pixel of the first contour until a pixel is found having the same coordinates as the first pixel of the second contour to identify a second overlapping portion of the contours; and
  vi. combining two or more non-discarded portions of the first and second contours to create the full contour of the object.

10. The method of claim 1, wherein the first one-directional pass is a row-by-row or column-by-column pass.

11. A system for extracting contours in a digital image, the system comprising:
a local memory for storing data corresponding to the image; and a processor comprising:
  i. a memory management unit for loading a portion of the image from an external memory to the local memory, and
  ii. an execution unit for executing instructions to (i) perform a first one-directional pass across the digital image by analyzing the portion of the image, the pass identifying a portion of a contour of an object in the digital image, (ii) combine the portions of the contour into a complete contour of the object; and (iv) analyze the contour to classify the contour as a full closed-path contour comprising identifying an edge pixel for a first contour portion, identifying an edge pixel for a second contour portion, and in a second pass traversing the contour from the edge pixel of the second contour portion until finding a pixel having coordinates the same as the edge pixel for the first contour portion, and identifying an overlapping portion of the first and second contour portions, and discarding the overlapping portions.

12. The system of claim 11, wherein the processor is a digital-signal processor.

13. The system of claim 11, further comprising a high-speed interface that connects the local memory to the processor and a low-speed interface that connects the external memory to the processor.

14. The system of claim 11, wherein a size of the local memory is less than the size of the image.

15. The system of claim 11, wherein the instructions to combine the portions of the contour comprise instructions to search for an endpoint of a first contour portion in a second, adjacent contour portion and to connect the first and second contour portions at the endpoint.

16. The system of claim 11, wherein the execution unit is further configured for executing instructions for performing one two, or three additional passes.

17. The system of claim 16, wherein the passes comprise a top-to-bottom pass, a bottom-to-top pass, a left-to-right pass, and a right-to-left pass.

18. The system of claim 11, wherein the execution unit is further configured for executing instructions for performing at least one additional one-directional pass across the digital image if the contour is not classified as a full closed-path contour, and merging contour pixels identified in the at least one additional pass with the contour pixels identified in the first pass.

19. The system of claim 11, wherein:
traversing the contour comprises:
  i. identifying the overlapping portion of the first and second contour portions, comprising accessing a first pixel of the first contour; and
  ii. searching the second contour in the one direction from a second pixel of the second contour until a pixel is found having the same coordinates as the first pixel of the first contour to identify a first overlapping portion of the contours;
  iii. discarding the overlapping portion;
  iv. accessing a first pixel of the second contour;
  v. searching the first contour in the one direction from a second pixel of the first contour until a pixel is found having the same coordinates as the first pixel of the second contour to identify a second overlapping portion of the contours; and
  vi. combining two or more non-discarded portions of the first and second contours to create the full contour of the object.

20. The system of claim 11, wherein the first one-directional pass is a row-by-row or column-by-column pass.

21. One or more non-transitory computer-readable storage mediums having stored thereon executable instructions operable to instruct a processor for:
performing a first one-directional pass across the digital image, the pass comprising:
  i. loading rows or columns of the digital image from an external memory to a local memory,
  ii. identifying pixels in each row or column that correspond to a contour of an object in the digital image, and
  iii. adding the identified pixels to a list of contour pixels corresponding to the object for the current pass; and
  iv. combining the list of contour pixels from the pass into the contour of the object; and
performing a second pass, comprising analyzing the contour pixels to classify the contour as a full closed-path contour comprising identifying an edge pixel for a first contour portion, identifying an edge pixel for a second contour portion, traversing the contour from the edge pixel of the second contour portion until finding a pixel having coordinates the same as the edge pixel for the first contour portion, and identifying an overlapping portion of the first and second contour portions, and discarding the overlapping portion.

22. The one or more non-transitory computer-readable storage mediums of claim 21, wherein the instructions are further operable to instruct a processor for:

performing a second one-directional across the digital image to find a second contour, the pass comprising:

traversing the contour comprising:
   i. identifying the overlapping portion of the first and second contour portions, comprising accessing a first pixel of the first contour; and
   ii. searching the second contour in the one direction from a second pixel of the second contour until a pixel is found having the same coordinates as the first pixel of the first contour to identify a first overlapping portion of the contours;
   iii. discarding the overlapping portion;
   iv. accessing a first pixel of the second contour;
   v. searching the first contour in the one direction from a second pixel of the first contour until a pixel is found having the same coordinates as the first pixel of the second contour to identify a second overlapping portion of the contours; and
   vi. combining two or more non-discarded portions of the first and second contours to create the full contour of the object.

* * * * *